Nov. 29, 1966    O. V. THORBORG    3,288,191
HEADED FASTENER WITH LOCK
Filed May 20, 1964
FIG.1
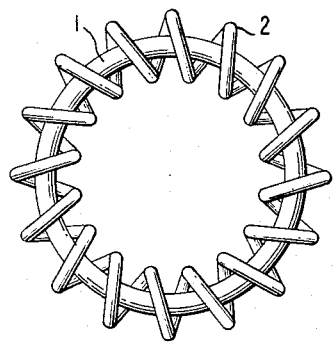
FIG.2
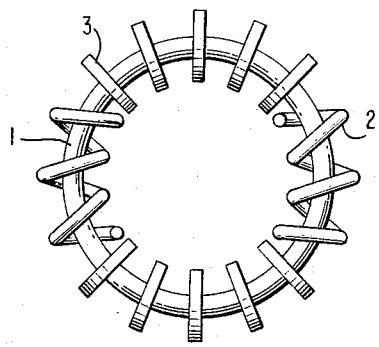
FIG.3a    FIG.3    FIG.4
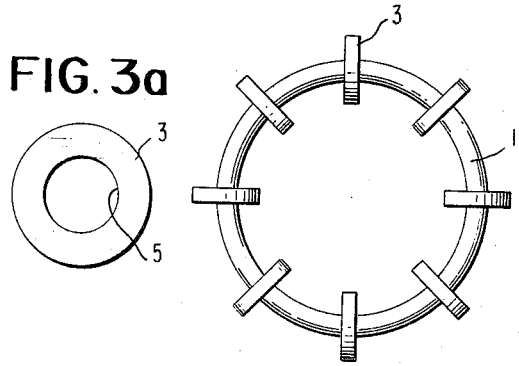
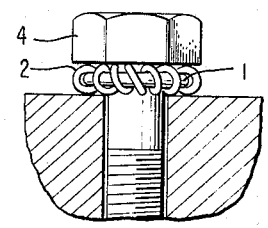
*INVENTOR.*
OLOF VIKTOR THORBORG
BY *Young + Thompson*
ATTORNEYS

United States Patent Office 3,288,191
Patented Nov. 29, 1966

3,288,191
HEADED FASTENER WITH LOCK
Olof Viktor Thorborg, 80 Linnegatan, Stockholm, Sweden
Filed May 20, 1964, Ser. No. 369,658
3 Claims. (Cl. 151—38)

*Description of patent*

The locking of nuts and bolts is mostly done with the help of springwashers but, as these washers when under strong or repeated pressure gradually lose their intitial locking power, other nut locking devices such as lock nuts, double nuts or welding are required, the use of these devices of necessity meaning a greater expenditure of time and money.

My invention described below is a nut or bolt locking device of simple construction easily applied as a springwasher and of a locking power and durability superior to that of the ordinary lock nuts—in one of its varieties (FIG. 2 and FIG. 3) having a locking power approaching that of welding.

It consists of either a ring or otherwise suitably formed piece of wire 1 passed through a wire helix (FIG. 1) or through a combination of a wire helix and hard metal washers of about the same transverse measurements as the helix (FIG. 2) or through entirely hard metal washers (FIGS. 3 and 3a). The central opening of the helix as well as of the washers 5 is bigger than the thickness of the inside wire making it possible for the coils of the helix and for the washers to tip over till they come into firm contact with the inside wire 1 when they are subjected to the screwing pressure of a nut or bolt head (FIG. 4), in that way becoming pawls hindering the nut or bolt from getting loose.

By the choice of screwpitch and screwthread of the helix in the first case (FIG. 1) the locking power can be varied to meet practically any demand of locking security. Extraordinary demands may call for still stronger nut locking measures. The nut locking devices shown in FIG. 2 and FIG. 3 have a locking power that can be increased to almost that of welding. The hard metal washers of these two constructions having no elasticity have to be crushed or deformed before losing their grip. They effect a firm juncture between the nut or the bolt head and the substrate.

Another advantage of my invention is that it can be utilized for locking the largest sizes of nuts and bolts without requiring complicated machinery for its production.

Having now described my invention what I claim is:

1. In combination with a headed fastener rotatable toward and away from a fixed substrate, a locking device disposed between the head of the fastener and the substrate, said locking device comprising a closed metal ring, and a wire helix forming a plurality of metal loops encompassing the ring, the inside diameter of the metal loops being substantially greater than the outside diameter of the metal ring, so that the metal loops serve as pawls when compressed by said headed fastener turned in one direction, thereby to prevent turning of the head of the fastener in the other direction, the spacing and the inside diameter of the loops and the outside diameter of the metal ring being so related that upon tilting, the loops come into firm gripping contact with the ring instead of with each other, whereby the metal ring limits the angle of tilt of the loops independently of the number of loops.

2. In combination with a headed fastener rotatable toward and away from a fixed substrate, a locking device disposed between the head of the fastener and the substrate, said locking device comprising a closed metal ring, and means forming a plurality of metal loops encompassing the ring, said loops being provided in part by a wire helix and in part by a plurality of metal washers of about the same transverse measurements as the helix, the inside diameter of the metal loops being substantially greater than the outside diameter of the metal ring, so that the metal loops serve as pawls when compressed by said headed fastener turned in one direction, thereby to prevent turning of the head of the fastener in the other direction, the spacing and the inside diameter of the loops and the outside diameter of the metal rim being so related that upon tilting, the loops come into firm gripping contact with the ring instead of with each other, whereby the metal ring limits the angle of tilt of the loops independently of the number of loops.

3. In combination with a headed fastener rotatable toward and away from a fixed substrate, a locking device disposed between the head of the fastener and the substrate, said locking device comprising a closed metal ring, and a plurality of metal washers forming a plurality of metal loops encompassing the ring, the inside diameter of the metal loops being substantially greater than the outside diameter of the metal ring, so that the metal loops serve as pawls when compressed by said headed fastener turned in one direction, thereby to prevent turning of the head of the fastener in the other direction, the spacing and the inside diameter of the loops and the outside diameter of the metal ring being so related that upon tilting, the loops come into firm gripping contact with the ring instead of with each other, whereby the metal ring limits the angle of tilt of the loops independently of the number of loops.

References Cited by the Examiner

UNITED STATES PATENTS 3,041,752 7/1962 Evans _____ 85—8.3

FOREIGN PATENTS 302,815 12/1917 Germany.
 79,904 1/1935 Sweden.
224,716 3/1943 Switzerland.

CARL W. TOMLIN, *Primary Examiner.*

EDWARD C. ALLEN, *Examiner.*

R. S. BRITTS, *Assistant Examiner.*